(12) United States Patent
Ishihara

(10) Patent No.: US 11,843,615 B2
(45) Date of Patent: Dec. 12, 2023

(54) ATTACK RESPONSE POINT SELECTING APPARATUS AND ATTACK RESPONSE POINT SELECTING METHOD

(71) Applicant: NIPPON TELEGRAPH AND TELEPHONE CORPORATION, Tokyo (JP)

(72) Inventor: Yuichi Ishihara, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 326 days.

(21) Appl. No.: 17/256,089

(22) PCT Filed: Jun. 27, 2019

(86) PCT No.: PCT/JP2019/025609
§ 371 (c)(1),
(2) Date: Dec. 24, 2020

(87) PCT Pub. No.: WO2020/017272
PCT Pub. Date: Jan. 23, 2020

(65) Prior Publication Data
US 2021/0273952 A1   Sep. 2, 2021

(30) Foreign Application Priority Data

Jul. 17, 2018   (JP) .................................. 2018-134262

(51) Int. Cl.
*H04L 29/06* (2006.01)
*H04L 9/40* (2022.01)

(52) U.S. Cl.
CPC ................................ *H04L 63/1416* (2013.01)

(58) Field of Classification Search
CPC .................. H04L 63/1425; H04L 63/1416
See application file for complete search history.

(56) References Cited

U.S. PATENT DOCUMENTS 6,779,039 B1 *   8/2004   Bommareddy ......... H04L 61/35
                                                              709/245
7,313,094 B2 *   12/2007   Oki ........................ H04L 45/70
                                                              370/252

(Continued)

FOREIGN PATENT DOCUMENTS

CA            2963544 A1 *   7/2012    ......... H04L 63/1416
CN         115208823 A    * 10/2022

(Continued)

OTHER PUBLICATIONS

NPL Search (InnovationQ) (Year: 2023).*

(Continued)

*Primary Examiner* — Yin Chen Shaw
*Assistant Examiner* — Richard W Cruz-Franqui
(74) *Attorney, Agent, or Firm* — IPUSA, PLLC

(57) ABSTRACT

An attack handling location selection apparatus includes an acquisition unit configured to acquire traffic volumes of a plurality of first transfer apparatuses related to a path of an attack traffic, and a selection unit configured to assign priorities based on the traffic volumes to second transfer apparatuses extracted from the plurality of first transfer apparatuses based on comparison between the traffic volume of each first transfer apparatus and an upper limit value of a traffic volume capable of being handled by a protection apparatus configured to handle the attack traffic, and select, as a forwarding point of the traffic to the protection apparatus, a highest-ranking third transfer apparatus in the priorities. Thus, a forwarding point capable of increasing the likelihood that attack traffic is appropriately handled is selected.

5 Claims, 11 Drawing Sheets

(56) References Cited

U.S. PATENT DOCUMENTS

| | | | |
|---|---|---|---|
| 7,512,408 B2* | 3/2009 | Marais | H04L 67/14 709/227 |
| 7,895,299 B2* | 2/2011 | Betts | H04L 67/63 709/241 |
| 7,904,586 B1* | 3/2011 | Griffin | H04L 45/00 709/240 |
| 8,320,254 B2* | 11/2012 | Xin | H04L 47/17 709/242 |
| 8,331,371 B2* | 12/2012 | Judge | H04L 45/30 370/408 |
| 8,611,355 B1* | 12/2013 | Sella | H04L 45/125 370/409 |
| 8,964,596 B1* | 2/2015 | Yermakov | H04L 41/0816 370/252 |
| 9,560,072 B1* | 1/2017 | Xu | H04L 63/1475 |
| 9,660,886 B1* | 5/2017 | Ye | H04L 41/12 |
| 10,021,028 B2* | 7/2018 | Le | H04L 43/0876 |
| 10,277,499 B2* | 4/2019 | Ferguson | H04L 12/4625 |
| 10,341,259 B1* | 7/2019 | Singh | H04L 45/42 |
| 2005/0165901 A1* | 7/2005 | Bu | H04L 47/115 709/217 |
| 2005/0180416 A1* | 8/2005 | Jayawardena | H04L 63/1408 370/389 |
| 2006/0203828 A1* | 9/2006 | Kumazawa | H04L 45/306 370/389 |
| 2007/0008884 A1* | 1/2007 | Tang | H04L 9/40 370/230 |
| 2007/0191033 A1* | 8/2007 | Marais | H04L 67/14 455/466 |
| 2008/0140795 A1* | 6/2008 | He | H04L 63/1416 709/207 |
| 2008/0285541 A1* | 11/2008 | Van Der Merwe | H04L 45/42 370/351 |
| 2009/0113514 A1* | 4/2009 | Hu | H04L 65/1066 726/1 |
| 2010/0226251 A1* | 9/2010 | Imai | H04L 45/125 370/235 |
| 2011/0063976 A1* | 3/2011 | Birk | H04L 43/16 370/235 |
| 2012/0033567 A1* | 2/2012 | Yamada | H04L 45/60 370/252 |
| 2012/0230199 A1* | 9/2012 | Chiabaut | H04L 45/48 370/238 |
| 2014/0016640 A1* | 1/2014 | Hikichi | H04L 45/74 370/392 |
| 2015/0139237 A1* | 5/2015 | Maeda | H04W 40/00 370/392 |
| 2015/0281042 A1* | 10/2015 | Agarwal | H04L 45/64 709/238 |
| 2017/0019430 A1* | 1/2017 | Cohn | H04L 65/1036 |
| 2017/0085488 A1* | 3/2017 | Bhattacharya | H04L 41/122 |
| 2017/0085629 A1* | 3/2017 | Mahapatra | H04L 67/1036 |
| 2017/0093710 A1* | 3/2017 | Garcia-Luna-Aceves | H04L 45/74 |
| 2018/0020016 A1* | 1/2018 | Hu | H04L 63/1458 |
| 2020/0177626 A1* | 6/2020 | Wichtlhuber | H04L 63/1441 |
| 2021/0067490 A1* | 3/2021 | Nishijima | H04L 63/1425 |
| 2021/0273952 A1* | 9/2021 | Ishihara | H04L 63/1458 |
| 2022/0070672 A1* | 3/2022 | Zhang | H04W 64/00 |
| 2023/0064425 A1* | 3/2023 | Sellappa | H04L 45/54 |

FOREIGN PATENT DOCUMENTS

| | | | | |
|---|---|---|---|---|
| EP | 3253025 A1 | * | 12/2017 | H04L 29/06 |
| JP | 2006350561 A | * | 12/2006 | |
| JP | 2010283666 A | * | 12/2010 | |
| JP | 2011029788 A | * | 2/2011 | |
| JP | 2012108733 A | * | 6/2012 | |
| JP | 2018032906 A | * | 3/2018 | |
| KR | 20160139591 A | * | 5/2015 | H04L 45/70 |
| TW | 1713332 B | * | 12/2020 | H04L 12/803 |
| WO | WO-03073701 A1 | * | 9/2003 | H04L 45/02 |

OTHER PUBLICATIONS

Google Scholar History Search (Year: 2023).* sFlow.org., "Developer Information: Specifications of sFlow", Internet <URL: http://www.sflow.org/developers/specifications.php>, Jun. 27, 2017(Reading day).

B. Claise, Ed., "Cisco Systems NetFlow Services Export Version 9", Internet <URL: https://www.ietf.org/rfc/rfc3954.txt>, Network Working Group, Request for Comments: 3954, Category: Informational, Oct. 2004.

* cited by examiner

ATTACK RESPONSE POINT SELECTING APPARATUS AND ATTACK RESPONSE POINT SELECTING METHOD

TECHNICAL FIELD

The present invention relates to an attack handling location selection apparatus and an attack handling location selection method.

BACKGROUND ART

When inflow of attack traffic to a server within a network or to a user connected to the network is detected, there is a need to continue a service while quickly handling the attack traffic. A general method for handling an attack while continuing a service is a method of forwarding attack traffic to a protection apparatus such as a mitigation apparatus.

CITATION LIST

Non Patent Literature

NPL 1: Internet <URL: http://www.sflow.org/developers/specifications.php>
NPL 2: Internet <URL: https://www.ietforg/rfc/rfc3954.txt>

SUMMARY OF THE INVENTION

Technical Problem

When a forwarding point (a router or the like) of the attack traffic is randomly decided when forwarding the attack traffic to the protection apparatus, it may be difficult to perform appropriate handling.

For example, when a location through which a large volume of traffic passes is the forwarding point, there is a possibility that traffic exceeding an upper limit of a handling resource of the protection apparatus enters the protection apparatus. In this case, there is a possibility that an abnormality such as function stoppage occurs in some protection apparatuses.

When a large volume of attack traffic enters the protection apparatus, even if attack traffic equal to or less than the upper limit of the handling resource enters the protection apparatus, there is a possibility that the transfer cost for forwarding the attack traffic and the transfer cost for returning the handled traffic to an original path are too high to be ignored in terms of operation.

Thus, when the attack traffic is forwarded to the protection apparatus, there is a need to select the forwarding point in consideration of the handling resource capacity of the protection apparatus and the transfer costs of forwarding and returning.

The present invention has been made in view of the above points, and an object of the present invention is to select a forwarding point capable of increasing the likelihood that attack traffic is appropriately handled.

Means for Solving the Problem

To solve the above problem, an attack handling location selection apparatus includes an acquisition unit configured to acquire traffic volumes of a plurality of first transfer apparatuses related to a path of attack traffic, and a selection unit configured to assign priorities based on the traffic volumes to second transfer apparatuses extracted from the plurality of first transfer apparatuses based on comparison between a traffic volume of each first transfer apparatus and an upper limit value of a traffic volume capable of being handled by a protection apparatus that handles the attack traffic, and selects, as a forwarding point of the traffic to the protection apparatus, a highest-ranking third transfer apparatus in the priorities.

Effects of the Invention

It is possible to select a forwarding point capable of increasing the likelihood that attack traffic is appropriately handled.

DESCRIPTION OF EMBODIMENTS

Figure 1:
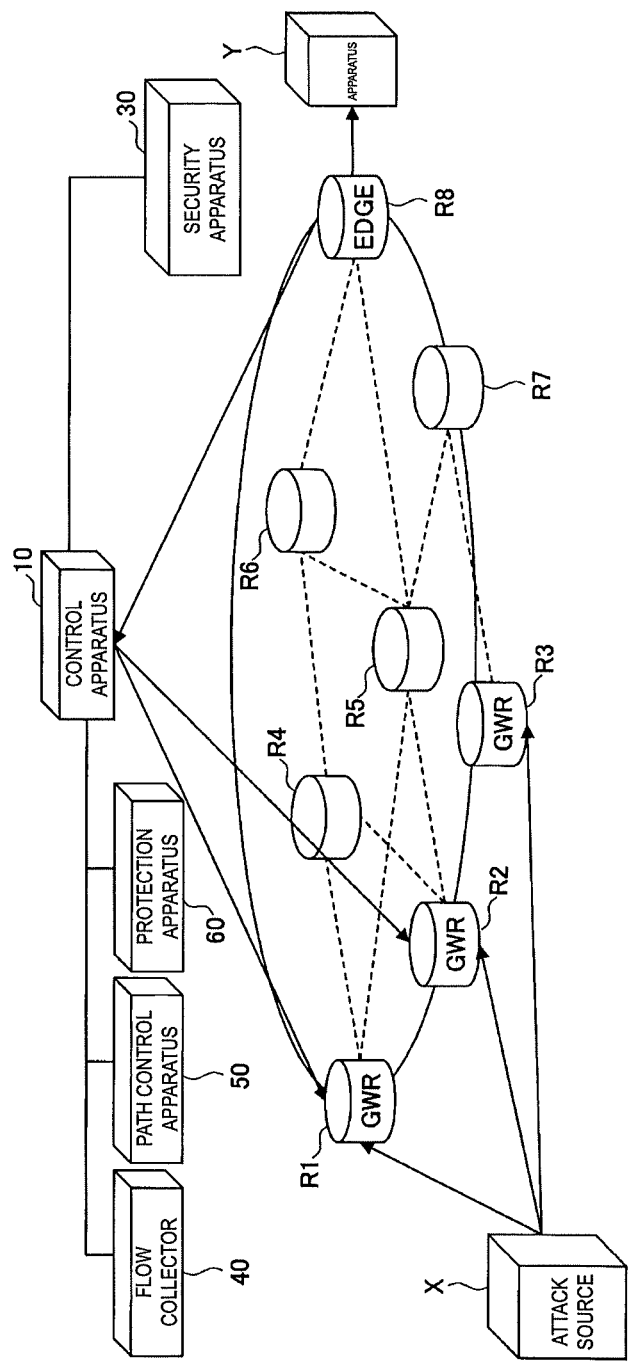
FIG. 1 is a diagram illustrating an example of a network configuration according to an embodiment of the present invention.

Hereinafter, an embodiment of the present invention will be described with reference to the drawings. FIG. 1 is a diagram illustrating an example of a network configuration according to an embodiment of the present invention. In FIG. 1, a network N1 includes a plurality of routers (transfer apparatuses) such as routers R1 to R8. Among these routers, the router R1, the router R2, and the router R3 are gateway routers (GWR). In the present embodiment, three GWRs (the routers R1, R2, and R3) initially receive IP packets (hereinafter, referred to as "attack packets") related to attack traffic from an attack source X of a cyber-attack (for example, a distributed denial-of-service (DDoS) attack) in the network N1.

The router R8 is an edge router for an apparatus Y. The apparatus Y is, for example, a computer that is the target of a cyber-attack in the present embodiment. Thus, in the present embodiment, the transmission source of the attack packet (attack communication) is the attack source X, and the destination of the attack packet is the apparatus Y. When the routers are not distinguished from each other, the routers are individually referred to as a "router R". Alternatively, the attack source X may be distributed as a plurality of sources. In this case, the transmission source of the attack packet received by each GWR may be different. One GWR may receive the attack packets from a plurality of transmission sources.

The routers R1, R2, and R3 as the GWRs, and the router R8 as the edge router are connected to a control apparatus 10 via a predetermined line (network).

The control apparatus 10 is one or more computers (information processing apparatuses) that control handling of the attack packets entering the network N1. That is, the control apparatus 10 may be one computer or may be constituted by a plurality of distributed computers. In the present embodiment, the control apparatus 10 specifies one router R from a group of the routers R that is a location (hereinafter, referred to as a "forwarding point") at which the attack packets are forwarded to a protection apparatus 60.

In FIG. 1, the control apparatus 10 is connected to a security apparatus 30, a flow collector 40, a path control apparatus 50, and the protection apparatus 60 via a network.

The security apparatus 30 is an apparatus that detects the occurrence of a cyber-attack and notifies the control apparatus 10 of information indicating the condition of the attack packets. Alternatively, the apparatus Y may also serve as a function of the security apparatus 30.

The flow collector 40 is connected to each router R, collects information (only information related to the transfer of the packets, with information related to a data unit excluded) included in the packets transferred by each router R, and generates statistical information (flow information) of the collected information.

The path control apparatus 50 is connected to each router R and is an apparatus that instructs the router R selected as the forwarding point by the control apparatus 10 to change a transfer path of the packets.

The protection apparatus 60 is an apparatus that forwards traffic from the router R as the forwarding point, handles the attack traffic, and allows normal traffic to pass through. The protection apparatus 60 is directly or indirectly connected to each router R. However, the traffic (packets) does not enter the protection apparatus 60 from any router R at a normal time.

The connection relationship between the flow collector 40, the path control apparatus 50, the protection apparatus 60, and each router R is omitted from the drawings for the sake of convenience.

Figure 2:
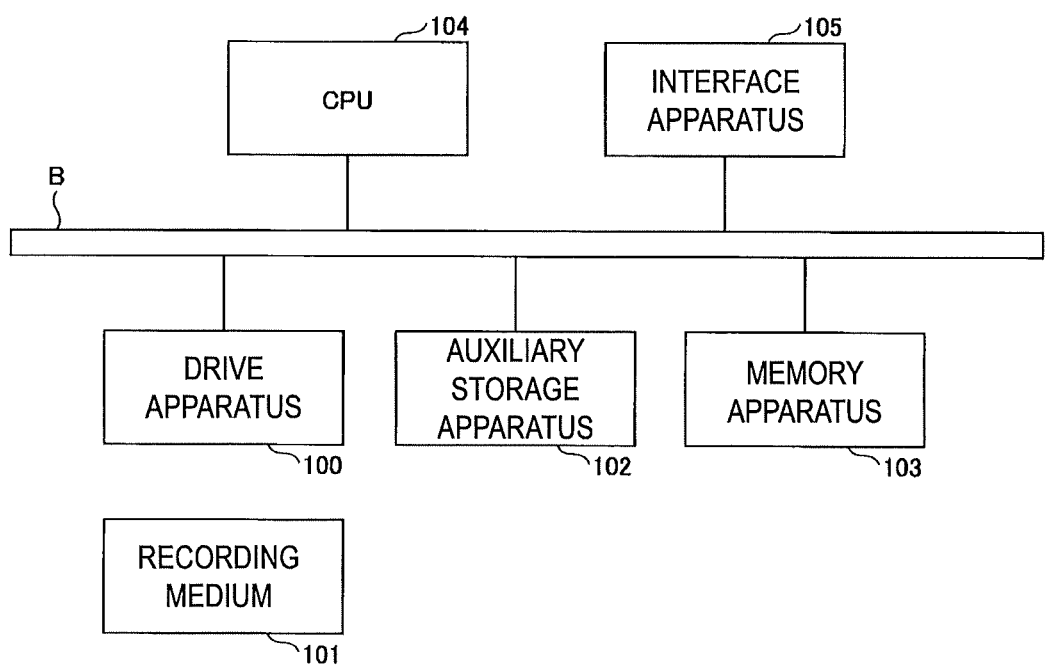
FIG. 2 is a diagram illustrating an example of a hardware configuration of a control apparatus 10 according to the embodiment of the present invention.

FIG. 2 is a diagram illustrating an example of a hardware configuration of the control apparatus 10 according to the embodiment of the present invention. The control apparatus 10 of FIG. 2 includes a drive apparatus 100, an auxiliary storage apparatus 102, a memory apparatus 103, a CPU 104, and an interface apparatus 105 that are connected to each other via a bus B.

A program for realizing processing with the control apparatus 10 is provided by a recording medium 101 such as a CD-ROM. When the recording medium 101 storing a program is set in the drive apparatus 100, the program is installed in the auxiliary storage apparatus 102 from the recording medium 101 via the drive apparatus 100. However, the program is not necessarily installed from the recording medium 101 and may be installed by being downloaded from another computer through a network. The auxiliary storage apparatus 102 stores the installed program and stores necessary files, data, and the like.

The memory apparatus 103 reads out the program from the auxiliary storage apparatus 102 when an instruction for starting up the program has been given, and stores the program. The CPU 104 performs functions related to the control apparatus 10 in accordance with the program stored in the memory apparatus 103. The interface apparatus 105 is used as an interface for connection to a network.

Figure 3:
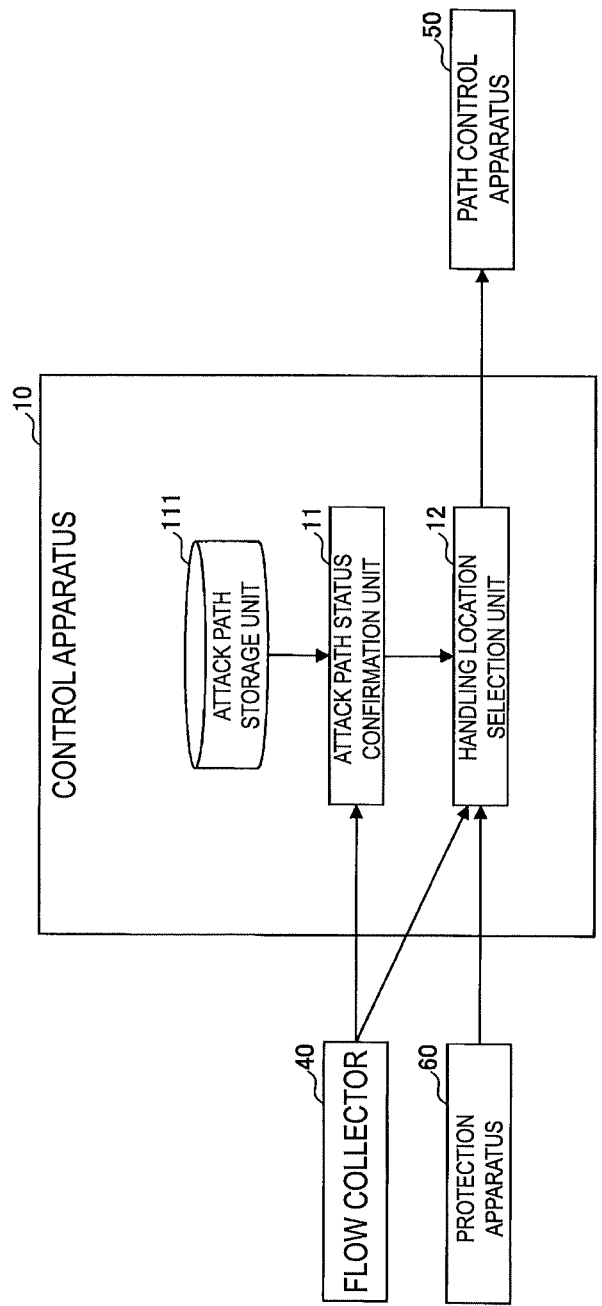
FIG. 3 is a diagram illustrating an example of a functional configuration of the control apparatus 10 according to the embodiment of the present invention.

FIG. 3 is a diagram illustrating an example of a functional configuration of the control apparatus 10 according to the embodiment of the present invention. In FIG. 3, the control apparatus 10 has an attack path status confirmation unit 11 and a handling location selection unit 12. Each of these units is realized by processing that the CPU 104 is caused to execute by one or more programs installed in the control apparatus 10. The control apparatus 10 utilizes an attack path storage unit 111. The attack path storage unit 111 can be realized by using, for example, the auxiliary storage apparatus 102, a storage apparatus connectable to the control apparatus 10 via a network, or the like.

The attack path storage unit 111 stores path information indicating a path (hereinafter referred to as an "attack path") specified in the network N1 for the attack packets in association with attack information including information (for example, 5tuple information) indicating the condition related to the attack packets. The path information is, for example, an arrangement in which identification information (for example, an IP address) of each router R on the attack path is arranged in the order through which the attack packets pass. However, the format of the path information is not limited to a predetermined format. Path information related to a plurality of attack paths may be stored in the attack path storage unit 111. The method for specifying the path information of the attack packets (hereinafter referred to as "attack path information") is not limited to a predetermined method. The structure of the attack path information is not limited to a predetermined structure as long as the information can specify the attack path.

The attack path status confirmation unit 11 checks the status (traffic volume or the like) of each router R (on the attack path) related to the attack path indicated by the attack path information stored in association with the attack information in the attack path storage unit 111.

The handling location selection unit 12 selects (specifies) the router R as the forwarding point (attack handling location) from among the routers R1 to R8 based on a resource capacity of the protection apparatus 60, a checking result of the attack path status confirmation unit 11, and the like.

A processing procedure executed by the control apparatus 10 will be described below. In the present embodiment, the processing procedure of the control apparatus 10 is described by distinguishing between a case where a forwarded traffic volume equal to or greater than an upper limit of a handling resource (resource for handling the attack packets) of the protection apparatus 60 is not allowed (a case where behavior of the protection apparatus 60 is influenced by the inflow of traffic exceeding the upper limit) and another case (a case where the attack packets corresponding to the traffic exceeding the upper limit are returned from the protection apparatus 60 without being handled). That is, behavior when traffic equal to or greater than the upper limit of the handling resource enters varies depending on the specifications of the protection apparatus 60. There is a possibility that the optimal forwarding point varies depending on whether traffic volume equal to or greater than the upper limit of the handling resource of the protection apparatus 60 is allowed to be forwarded. Thus, in the present embodiment, the processing procedure of the control apparatus 10 is distinguished between a case where traffic volume equal to or greater than the upper limit of the handling resource of the protection apparatus 60 is not allowed to be forwarded and another case.

Figure 4:
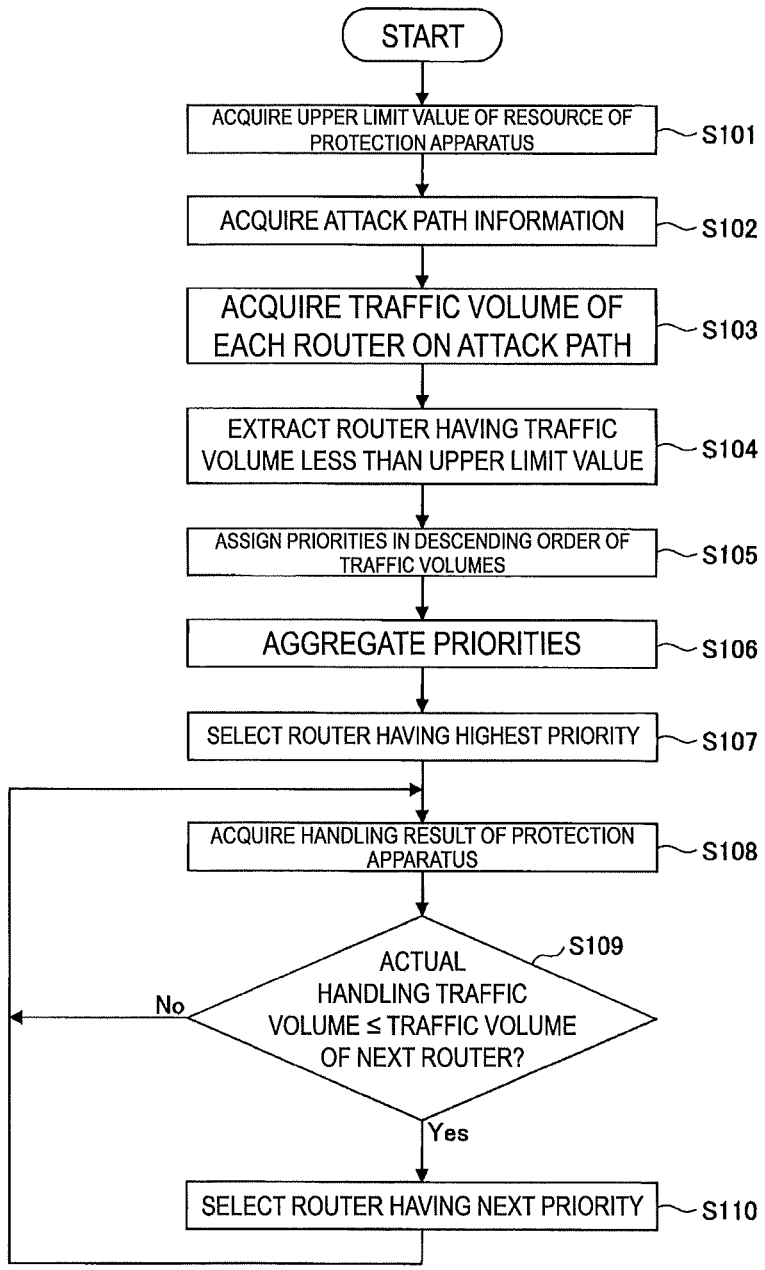
FIG. 4 is a flowchart for describing an example of a processing procedure executed by the control apparatus 10 when a traffic volume equal to or greater than an upper limit of a handling resource of a protection apparatus 60 is not allowed to be forwarded.

FIG. 4 is a flowchart for describing an example of the processing procedure executed by the control apparatus 10 when traffic volume equal to or greater than the upper limit of the handling resource of the protection apparatus 60 is not allowed to be forwarded.

In Step S101, the attack path status confirmation unit 11 acquires an upper limit value of the handling resource of the protection apparatus 60 (hereinafter referred to as a "protection upper limit value"). The protection upper limit value may be acquired from the protection apparatus 60, or may be stored in advance in the auxiliary storage apparatus 102 or the like. Subsequently, the attack path status confirmation unit 11 acquires the attack path information from the attack path storage unit 111 (S102). Subsequently, the attack path status confirmation unit 11 acquires the traffic volume of each router R related to the attack path indicated by the attack path information from, for example, the flow collector 40 (S103).

Figure 5:
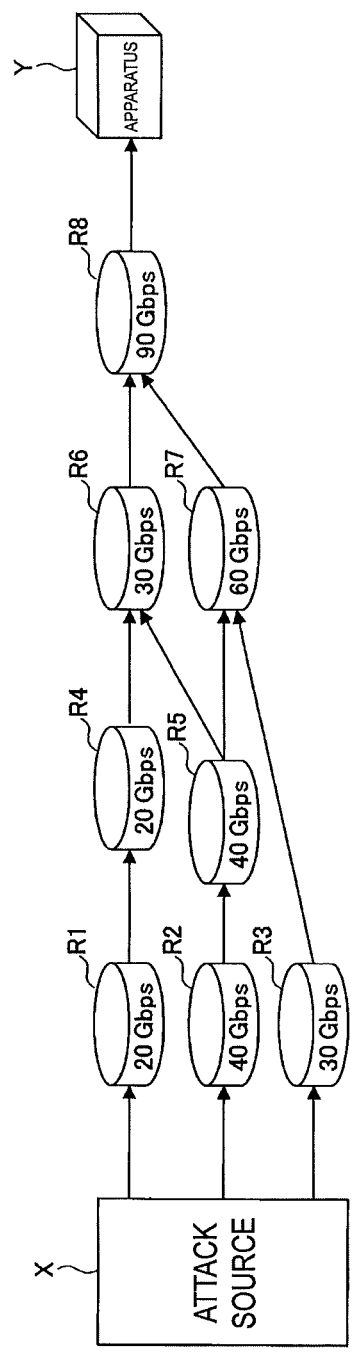
FIG. 5 is a diagram illustrating an example of an attack path and traffic volume of individual routers R.

FIG. 5 is a diagram illustrating an example of the attack path and the traffic volume of each router R. In FIG. 5, the connection relationship of each router R indicates the attack path. The traffic volume of the router is indicated within each router R. In other words, an example in which the traffic volume is 20 Gbps, 40 Gbps, 30 Gbps, 20 Gbps, 40 Gbps, 30 Gbps, 60 Gbps, and 90 Gbps in order of the routers R1, R2, R3, R4, R5, R6, R7, and R8 is illustrated in FIG. 5. At a point in time of Step S103, the attack path status confirmation unit 11 may obtain information as illustrated in FIG. 5.

Subsequently, the handling location selection unit 12 extracts the router R having a traffic volume less than the protection upper limit value (S104). Here, it is assumed that the protection upper limit value is 50 Gbps. Accordingly, in the example of FIG. 5, routers other than the routers R7 and R8 are extracted. Subsequently, the handling location selection unit 12 assigns priorities to the extracted routers R in decreasing order of the traffic volumes (S105). At this time, the router close to the attack target (apparatus Y) on the attack path has a higher priority (is located in front) between the routers R with identical traffic volumes. This is because it is thought that the router R close to the attack target is likely to have concentrated traffic and is likely to effectively forward the attack packets. Thus, in the example of FIG. 5, the priorities ranking are "R5, R2, R6, R3, R4, and R1".

Subsequently, the handling location selection unit 12 aggregates a router R which has only one path to a router R at a previous stage (close to the attack source X) on the attack path to the previous-stage router R in the priorities, and assigns priorities to the routers again (S106). That is, the corresponding router R is removed from the priorities. Such aggregation (removal) is performed recursively. In the example of FIG. 5, the routers R4 and R5 are removed. As a result, the priorities are "R2, R6, R3, and R1". Hereinafter, the priorities are referred to as "final priorities". That is, it is considered that the plurality of routers R on one path is equivalent in effectiveness as the forwarding point. Accordingly, the plurality of routers R is aggregated to the foremost-stage router R. The aggregation of the router to the foremost-stage router R is performed in order to reduce the distribution amount of the attack packets in the network N1 by handling the attack packets on an upstream side of the attack path.

Subsequently, the handling location selection unit 12 selects, as the router R that is the forwarding point, the highest-ranking router R (router R2 in FIG. 5) in the final priorities, and notifies the path control apparatus 50 of the identification information of the selected router R (S107). The path control apparatus 50 instructs the router R corresponding to the notified identification information to change the path such that all traffic in the router R enters the protection apparatus 60. Alternatively, an instruction may be given such that the path of the traffic related to the attack information is to be changed provided that the router R can set a condition for the traffic whose path is to be changed.

Thereafter, in a state in which the traffic is forwarded to the protection apparatus 60 from the forwarding point, the attack path status confirmation unit 11 acquires a handling result for the attack packets in the protection apparatus 60 when a predetermined period of time elapses or in accordance with an operation instruction or the like of an operator or the like (S108). The handling result is, for example, information indicating a volume (Gbps) of traffic that is actually handled as the attack packets in the forwarded traffic, a resource capacity (Gbps) used for actual handling in the protection apparatus 60, and the like. The determination of whether the forwarded traffic is the attack packets is performed by using an existing technology related to the protection apparatus 60.

Subsequently, the handling location selection unit 12 compares an actual handling traffic volume for the attack packets specified based on the handling result with a current point traffic volume of the router R (router R6 in FIG. 5) having the ranking after the router R which is the current forwarding point in the final priorities (S109). For example, when the handling result indicates the volume (Gbps) of the traffic that is actually handled as the attack packets in the forwarded traffic, this volume may be specified as the actual handling traffic volume. Meanwhile, when the handling result indicates the resource capacity (Gbps) used for actual handling in the protection apparatus 60, the resource capacity may be specified as the actual handling traffic volume. The traffic volume of the router R having the next ranking at a current point in time may be acquired from the flow collector 40.

When the actual handling traffic volume for the attack packets is equal to or less than the traffic volume of the router R having the next ranking (Yes in S109), the handling location selection unit 12 selects the router R having the next ranking as a new forwarding point, and notifies the path control apparatus 50 of the identification information of the selected router R (S110). Processing executed by the path control apparatus 50 in accordance with the notification is as described in Step S107. Note that the path control apparatus 50 instructs the router R that is the original forwarding point to stop the inflow of traffic to the protection apparatus 60. That is, in the present embodiment, the forwarding point is aggregated to one location. By doing this, transfer cost for forwarding the traffic is reduced.

The traffic forwarded to the protection apparatus 60 also includes normal traffic, and thus, there is a possibility that the number of attack packets is small among the traffic forwarded to the protection apparatus 60 and the effect of handling is low. Thus, in Step S110, another forwarding point assumed to enable more effective handling is selected again. In Step S110, when there is no router R having the next ranking, that is, when the last router R in the final priorities is the forwarding point, the forwarding point does not need to be changed. Alternatively, Step S103 and subsequent steps may be repeated in accordance with satisfying a condition such as a predetermined number of repetitions or elapsing of a predetermined period of time, or in accordance with an operation instruction or the like of an operator or the like.

Meanwhile, when the actual handling traffic volume for the attack packets exceeds the traffic volume of the router R having the next ranking (No in S109), the forwarding point is not changed.

When the result of Step S109 is No, or after Step S110, Step S108 and subsequent steps are repeated.

Figure 6:
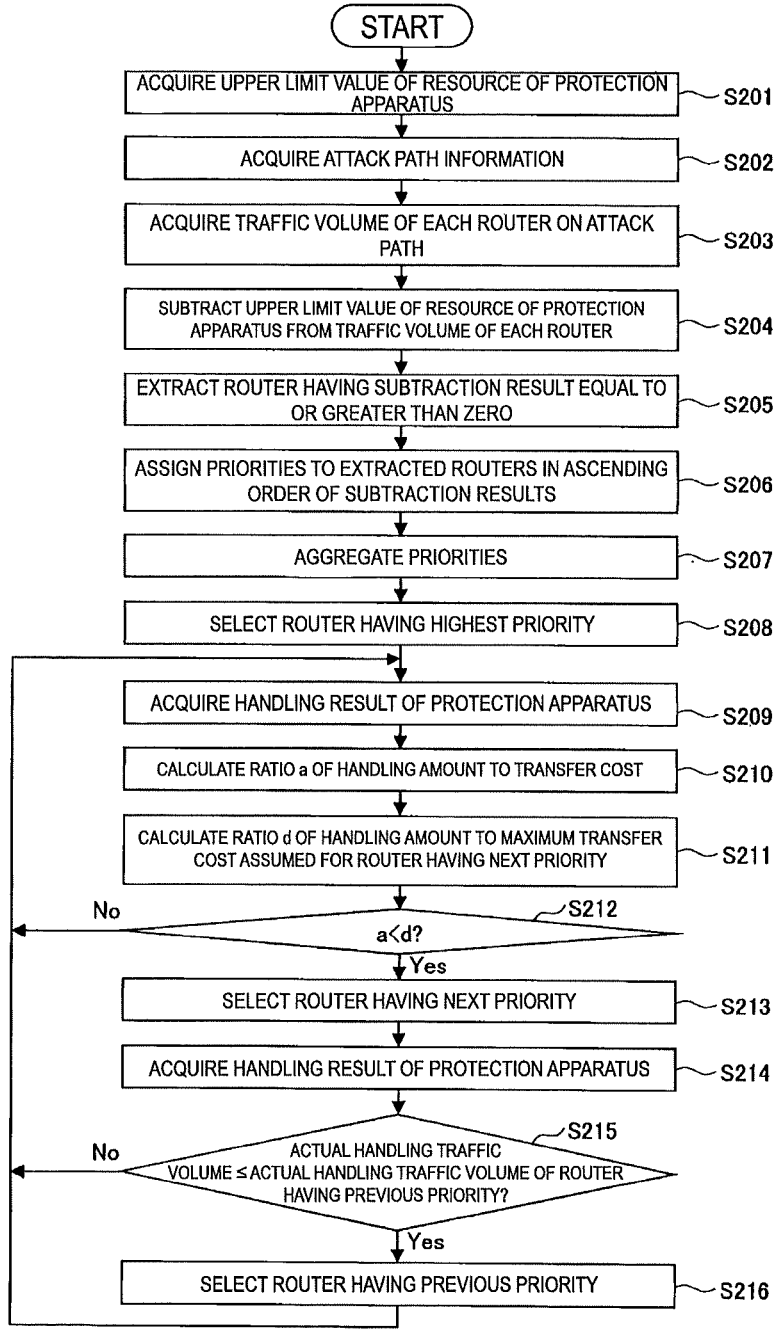
FIG. 6 is a flowchart for describing an example of a processing procedure executed by the control apparatus 10 when the traffic volume equal to or greater than the upper limit of the handling resource of the protection apparatus 60 is allowed to be forwarded.

FIG. 6 is a flowchart for describing an example of a processing procedure executed by the control apparatus 10 when traffic volume equal to or greater than the upper limit of the handling resource of the protection apparatus 60 is allowed to be forwarded.

Steps S201 to S203 are identical to Steps S101 to S103 of FIG. 4. In Step S204, the handling location selection unit 12 subtracts the protection upper limit value (50 Gbps) from the traffic volume of each router R related to the attack path.

Figure 7:
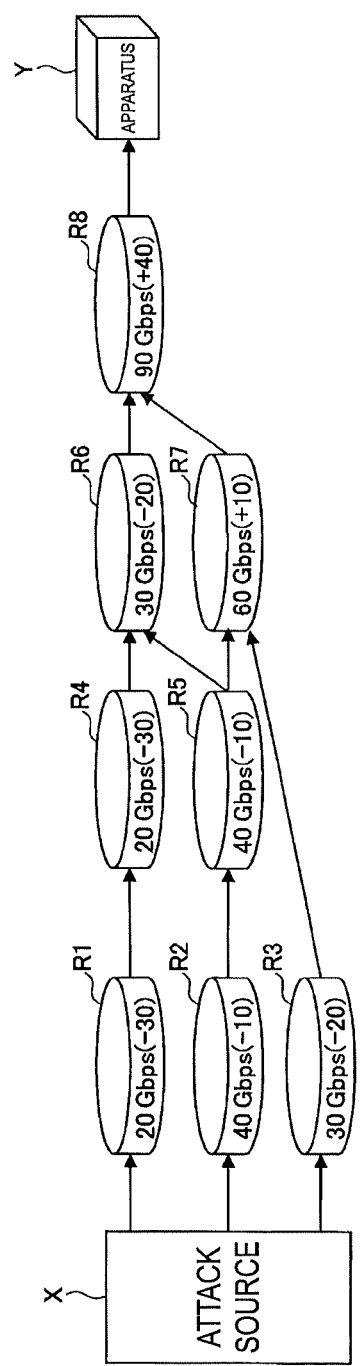
FIG. 7 is a diagram illustrating an example of a result obtained by subtracting an upper limit value of a resource of the protection apparatus 60 from the traffic volume of each router related to the attack path.

FIG. 7 is a diagram illustrating an example of a result obtained by subtracting the upper limit value of the resource of the protection apparatus 60 from the traffic volume of each router related to the attack path. In FIG. 7, the traffic volume and the subtraction result are illustrated within each router R (the subtraction result is bracketed). A positive subtraction result indicates the traffic volume returned without being handled by the protection apparatus 60. A negative subtraction result indicates the excess amount of the handling resource of the protection apparatus 60.

Subsequently, the handling location selection unit 12 extracts the router R having a subtraction result equal to or greater than zero (that is, the traffic volume is equal to or greater than the protection upper limit value) (S205). In the example of FIG. 7, the routers R7 and R8 are extracted. Subsequently, the handling location selection unit 12 assigns priorities to the extracted routers R in ascending order of the subtraction results (that is, in ascending order of the traffic volumes) (S206). In the example of FIG. 7, the priorities are "R7 and R8".

When there is no router R having a subtraction result equal to or greater than zero, Step S104 and subsequent steps of FIG. 4 need only be executed instead of Step S205 and subsequent steps after Step S204.

After Step S206, the handling location selection unit 12 performs aggregation identical to the aggregation in Step S106 of FIG. 4 on the priorities (S207). That is, the router R having only one path to the router R at the previous stage (close to the attack source X) is removed from the priorities. Hereinafter, the priorities in which the corresponding router R has been removed is referred to as "final priorities". In the example of FIG. 7, there is no corresponding router R, and thus, the final priorities are still "R7 and R8".

Subsequently, the handling, location selection unit 12 selects, as the router R that is the forwarding point, the highest-ranking router R (router R7 in FIG. 7) in the final priorities, and notifies the path control apparatus 50 of the identification information of the selected router R (S208). Processing executed by the path control apparatus 50 in accordance with the notification is as described in Step S107.

Thereafter, in a state in which the traffic is forwarded to the protection apparatus 60 from the forwarding point, the attack path status confirmation unit 11 acquires the handling result in the protection apparatus 60 (S209) when a predetermined period of time elapses or in accordance with an operation instruction or the like of an operator or the like. Subsequently, the handling location selection unit 12 calculates a ratio a of a handling amount to the transfer cost based on the actual handling traffic volume for the attack packets specified based on the handling result (S210). A method for calculating the ratio a of the handling amount to the transfer cost is as follows.

Ratio $a$ of handling amount to transfer cost=actual handling traffic volume/actual transfer cost $b$ in protection apparatus 60

Actual transfer cost $b$=forwarded traffic volume+ returned traffic volume $c$

Returned traffic volume $c$=forwarded traffic volume− actual handling traffic volume in protection apparatus 60

The forwarded traffic volume refers to the volume of traffic forwarded from the forwarding point to the protection apparatus 60.

Subsequently, the handling location selection unit 12 calculates a ratio d of a handling amount to the maximum transfer cost to be assumed for the router R (router R8 in FIG. 7, and referred to as a "next-ranking router R") having the next ranking after the router R that is the current forwarding point in the final priorities (S211). A method for calculating the ratio d of the handling amount is as follows.

Ratio $d$ of handling amount to assumed maximum transfer cost=upper limit handling resource capacity of protection apparatus 60/assumed transfer cost $e$ for next-ranking router $R$ Assumed transfer cost $e$=assumed forwarded traffic volume+(assumed forwarded traffic volume− upper limit handling resource capacity of protection apparatus 60)

Here, an actual measurement value of the forwarded traffic volume is unknown at a current point in time for the router R having the next ranking, and thus, an assumed value (estimated value) of the forwarded traffic volume is used to calculate the transfer cost related to the router R having the next ranking. The traffic volume of the next-ranking router R at the current point in time is applied to the assumed value (assumed forwarded traffic volume). The actual handling traffic volume in the protection apparatus 60 when the next-ranking router R is used as the forwarding point is unknown at the current point in time. Thus, the upper limit handling resource capacity of the protection apparatus 60 is used to calculate the transfer cost as the assumed value (estimated value) of the actual handling traffic volume. In this manner, the transfer cost is based on the assumed value (estimated value), and thus is described as the "assumed transfer cost e". In addition, the ratio d of the handling amount calculated using the assumed transfer cost e is also the assumed value (estimated value).

In Step S211, when there is no router R having the next ranking, that is, when the last router R is the forwarding point in the final priorities, the processing procedure executed by the control apparatus 10 may return to Step S209. Alternatively, Step S203 and subsequent steps may be repeated in accordance with satisfying a condition such as a predetermined number of repetitions or elapsing of a predetermined period of time, or in accordance with an operation instruction or the like of an operator or the like.

Subsequently, the handling location selection unit 12 compares the ratio a of the handling amount to the transfer cost with the ratio d of the handling amount to the maximum transfer cost to be assumed (S212). When a<d (Yes in S212), it is estimated that more attack packets can be handled, and thus, the handling location selection unit 12 selects the next-ranking router R as a new forwarding point and notifies the path control apparatus 50 of the identification information of the selected router R (S213). Processing executed by the path control apparatus 50 in accordance with the notification is as described in Step S110 of FIG. 4. When a≥d (No in S212), the processing procedure executed by the control apparatus 10 returns to Step S209 without changing the forwarding point.

After Step S213, the attack path status confirmation unit 11 acquires the handling result in the protection apparatus 60 when a predetermined period of time elapses or in accordance with an operation instruction or the like of an operator or the like (S214). Subsequently, the handling location selection unit 12 compares an actual handling traffic volume x for the attack packets specified based on the handling result (that is, the actual handling traffic volume at the current forwarding point) with a most-recent (acquired last) actual handling traffic volume y when the router R having a priority one before is the forwarding point (S215).

When the actual handling traffic volume x is equal to or less than the actual handling traffic volume y (Yes in S215), the handling location selection unit 12 selects, as a new forwarding point, the router R having a priority one before, and notifies the path control apparatus 50 of the identification information of the selected router R (S216). Processing executed by the path control apparatus 50 in accordance with the notification is as described in Step S110 of FIG. 4. Meanwhile, when the actual handling traffic volume y is less than the actual handling traffic volume x (No in S215), the forwarding point is not changed.

When the result of Step S215 is No, or after Step S216, Step S209 and subsequent steps are repeated.

Figure 8:
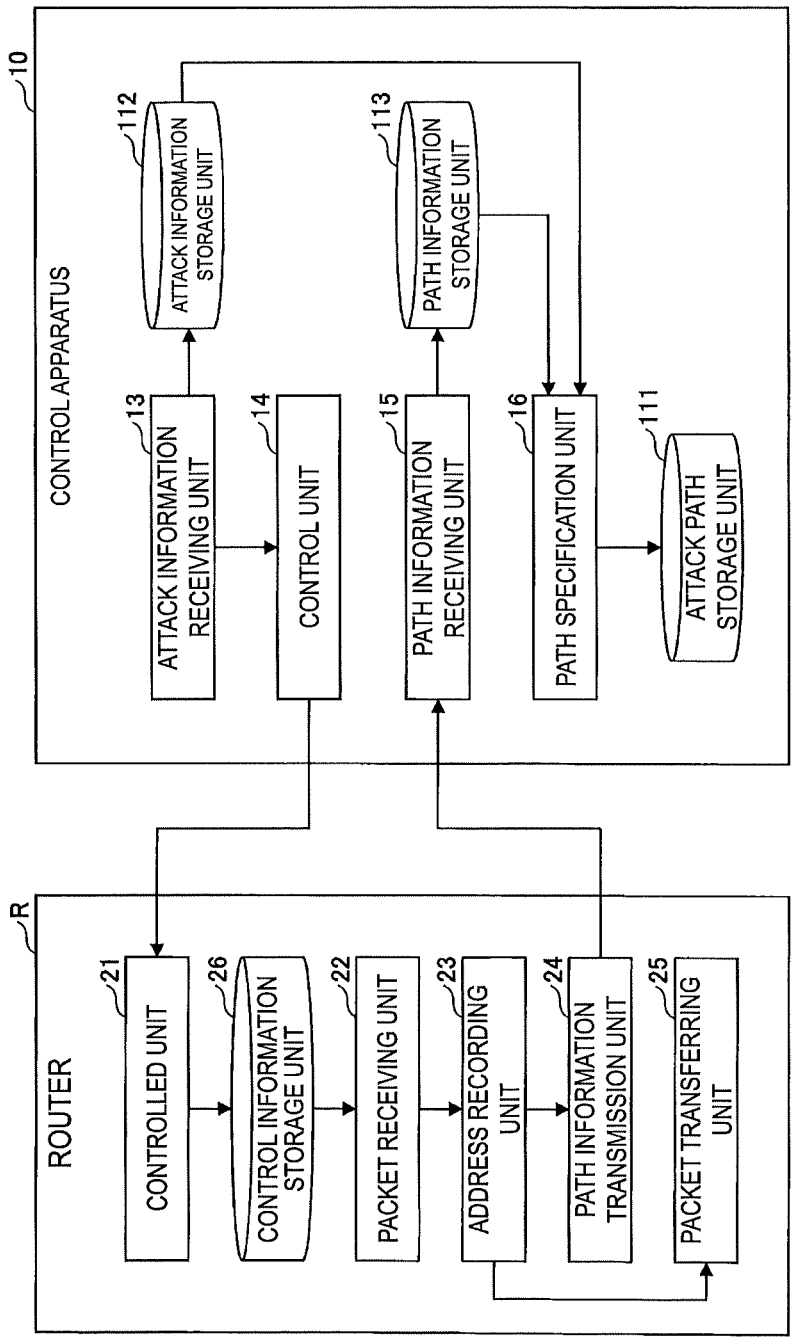
FIG. 8 is a diagram illustrating examples of functional configurations of the control apparatus 10 and the router R related to specification of the attack path.

Next, an example of a method for specifying the attack path will be described. FIG. 8 is a diagram illustrating examples of functional configurations of the control apparatus 10 and the router R related to the specification of the attack path. In FIG. 8, portions identical to those in FIG. 3 are denoted by identical reference signs, and descriptions thereof will be omitted.

In FIG. 8, the control apparatus 10 includes an attack information receiving unit 13, a control unit 14, a path information receiving unit 15, and a path specification unit 16. Each of these units is realized by processing that the CPU 104 is caused to execute by one or more programs installed in the control apparatus 10. The control apparatus 10 further uses an attack information storage unit 112, a path information storage unit 113, and the like. Each of these storage units can be realized by using, for example, the auxiliary storage apparatus 102, or a storage apparatus connectable to the control apparatus 10 via a network.

Meanwhile, the router R includes a controlled unit 21, a packet receiving unit 22, an address recording unit 23, a path information transmission unit 24, and a packet transferring unit 25. Each of these units is realized by processing that the CPU of the router R is caused to execute by one or more programs installed in the router R. Alternatively, each of these units may be realized by circuitry. The router R also uses a control information storage unit 26. The control information storage unit 26 can be realized by using, for example, a memory included in the router R. In the present embodiment, the controlled unit 21 and the control information storage unit 26 do not need to include any router other than the routers R1, R2, and R3, which are GWRs. The path information transmission unit 24 does not need to include any router other than the router R8, which is an edge router.

Figure 9:
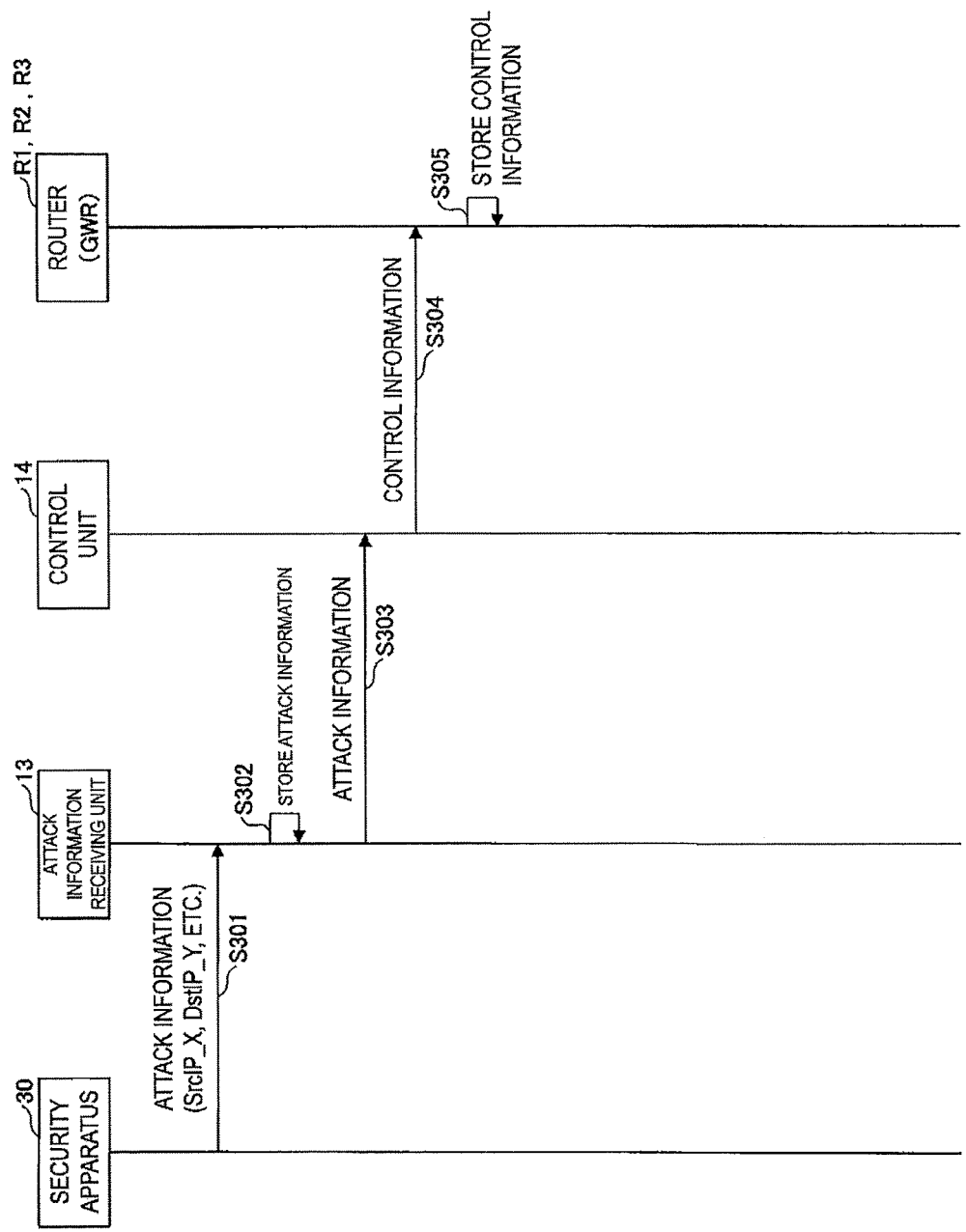
FIG. 9 is a sequence diagram for describing an example of a processing procedure executed during attack detection.

FIG. 9 is a sequence diagram for describing an example of a processing procedure executed during attack detection.

When a cyber-attack or the like on the apparatus Y is detected from the attack source X, the security apparatus 30 transmits, to the control apparatus 10, attack information including the information indicating the condition (for example, 5tuple information) related to the attack packets (S301). Syslog or the like may be used as the attack information. That is, all of information ascertainable by the security apparatus 30 may be included in the attack information. The 5tuple information is a transmission source IP address (SrcIP_X), a destination IP address (DstIP_Y), a transmission source port number, a destination port number, and a protocol.

When the attack information receiving unit 13 of the control apparatus 10 receives the attack information, the attack information receiving unit 13 stores records (Attack A, 5tuple information, etc.) including the attack information in the attack information storage unit 112 (S302). Thus, the attack information storage unit 112 stores a history of such attack information. The "Attack A" is an identifier of an attack and is assigned when the attack information is stored in the attack information storage unit 112.

Subsequently, the attack information receiving unit 13 notifies the control unit 14 of the attack information (S303). The control unit 14 transmits control information for executing special processing on the attack packets to the routers R1, R2, and R3 that are the GWRs in accordance with the notification of the attack information (S304). The control information includes 5tuple information as a condition of a packet to be controlled and a command for recording predetermined flag information in a specific portion of a TOS field of the attack packet (for example, setting 1 for a specific unused bit in the TOS field). The condition of the packet to be controlled is not limited to the 5tuple information. The transmission source IP address and the destination IP address may be used as the condition, or only the destination IP address may be used as the condition.

The controlled unit 21 of the router R1 that receives the control command stores the control information in the control information storage unit 26 of the router R1 (S305). The router R2 and router R3 that receive the control command execute identical processing.

The control information may be realized by using an existing filtering mechanism such as an Access Control List (ACL).

Figure 10:
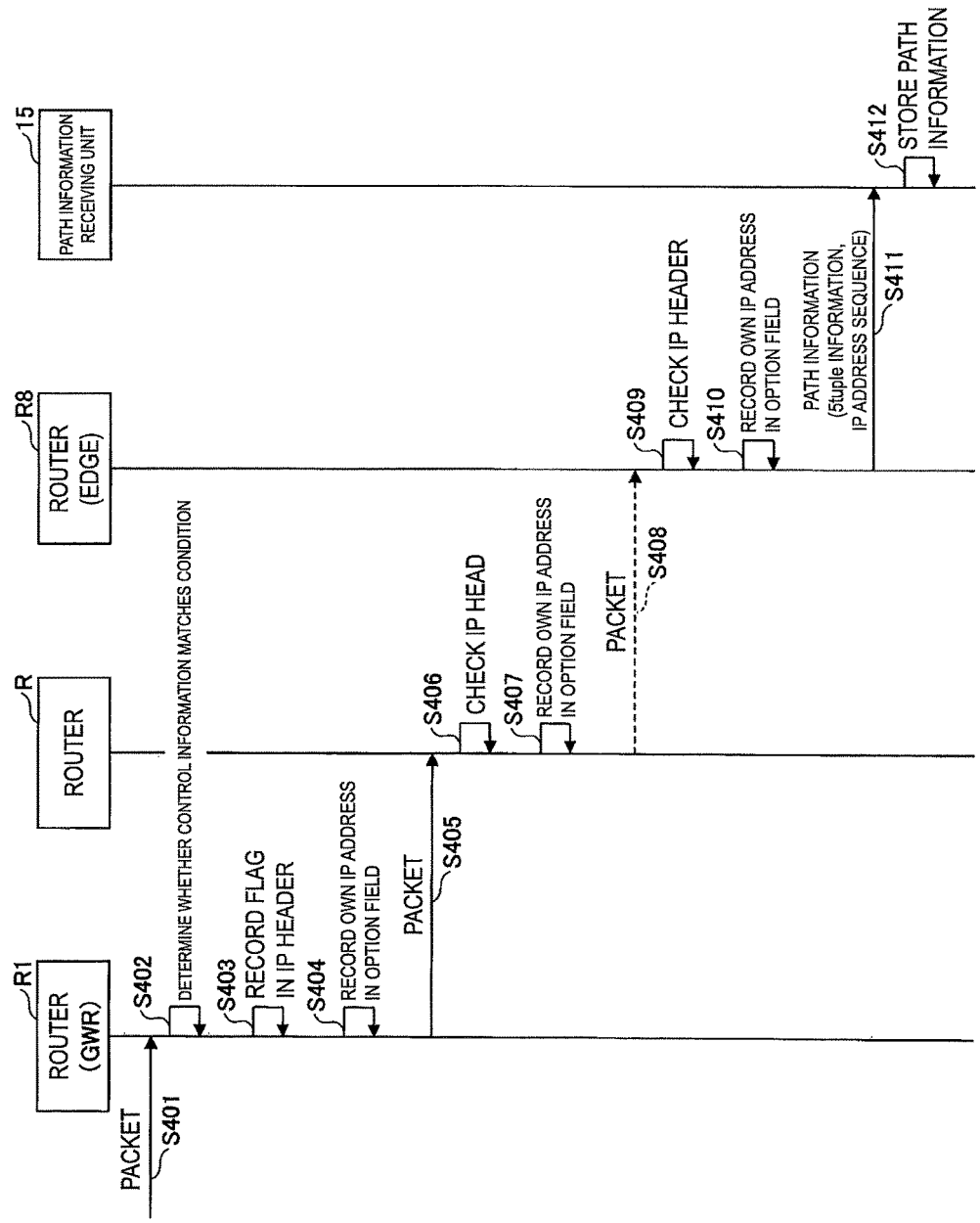
FIG. 10 is a sequence diagram for describing an example of a processing procedure executed in response to reception of an attack packet in a GWR.

FIG. 10 is a sequence diagram for describing an example of a processing procedure executed in response to reception of an attack packet in a GWR.

When a packet is received from outside the network N1 (S401), the packet receiving unit 22 of the router R1 determines whether the packet matches the condition included in the control information stored in the control information storage unit 26 in FIG. 9 (S402). For example, it is determined whether the 5tuple information of the packet matches the condition.

If the packet does not match the condition, general transfer processing other than the processing procedure of FIG. 10 is executed in subsequent steps.

If the packet matches the condition (that is, if the packet is the attack packet), the packet receiving unit 22 records the predetermined flag information in an IP header of the packet in accordance with the control information (S403). For example, the predetermined flag information may be recorded by setting 1 for the specific unused bit in the TOS field of the packet. However, the setting destination of the predetermined flag information is not limited to the ToS field. For example, when using an RR that is a mechanism of IPv4, a predetermined flag is set to a defined location in an option field. Subsequently, the address recording unit 23 of the router R1 determines whether the predetermined flag information is recorded in the packet, and records the IP address of the apparatus itself (router R1) in the option field of the IP header of the packet based on the fact that the predetermined flag information is recorded (S404). Then, the packet transferring unit 25 transfers the packet in accordance with a normal transfer method (S405).

When the packet receiving unit 22 of the router R, which is a transfer destination of the packet, receives the packet, the address recording unit 23 checks whether the predetermined flag information is recorded in the IP header of the packet (S406). The address recording unit 23 of the router R additionally records the IP address of the router R in the option field of the IP header of the packet based on the fact that the predetermined flag information is recorded in the packet (S407). That is, the IP address of the router is recorded at the end of the previously recorded IP address. Subsequently, the packet transferring unit 25 of the router R transfers the packet (S408).

Steps S406 to S408 are similarly executed in each router R as transfer destinations of the packet.

When the packet is received by the packet receiving unit 22 of the router R8, which is the edge router, processing identical to the processing in Steps S406 and S407 is executed in the router R8 (S409 and S410). Subsequently, based on the fact that the router R8 is the edge router, the path information transmission unit 24 of the router R8 transmits, to the control apparatus 10, the path information including the 5tuple information of the packet and an IP address sequence (IP address group) recorded in the option field of the IP header of the packet (S411). That is, the path information is transmitted to the control apparatus 10 immediately before the packet is transferred to the apparatus Y. The path information may be included in Flow information and transmitted by using a known mechanism such as sflow or NetFlow. The determination of whether a certain router R is the edge router may be performed based on a known technology.

Subsequently, the path information receiving unit 15 of the control apparatus 10 stores the received path information in the path information storage unit 113 (S412). Accordingly, the path information is additionally stored in the path information storage unit 113 each time the processing procedure of FIG. 10 is executed.

Figure 11:
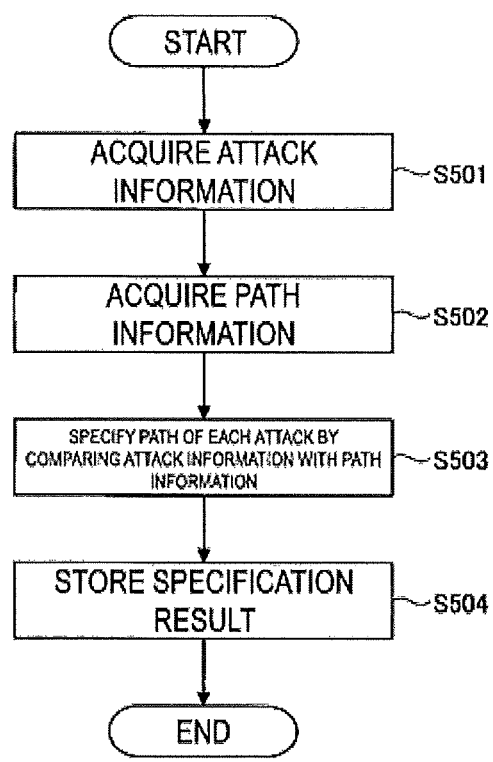
FIG. 11 is a flowchart for describing an example of a processing procedure executed by a path specification unit 16.

Next, processing executed by the path specification unit 16 of the control apparatus 10 will be described. FIG. 11 is a flowchart for describing an example of the processing procedure executed by the path specification unit 16. For example, the processing procedure of FIG. 11 may be executed synchronously with Step S412 of FIG. 10 (after S412), or may be periodically executed asynchronously with Step S412.

In Step S501, the path specification unit 16 acquires all of the attack information stored in the attack information storage unit 112.

Subsequently, the path specification unit 16 acquires all of the path information stored in the path information storage unit 113 (S502).

Subsequently, the path specification unit 16 specifies the path information (attack path information) corresponding to each piece of the attack information by comparing a list of the attack information and a list of the path information (S503). For example, for each piece of the attack information, path information including 5tuple information matching the 5tuple information included in the attack information is retrieved. The retrieved path information is associated with the attack information. As a result, the path specification unit 16 can ascertain the attack path within the network N1 for the attack packets of each DDos attack.

The granularity (condition) of the comparison does not necessarily have to be 5tuple. For example, the association may be made by a match between only the transmission source IP address and the destination IP address, or by a match between the destination IP address. This is because, for example, when there is a possibility that the attack reaches one destination IP address after passing through a plurality of paths, the path specification unit 16 can ascertain all the routes of the attack by comparison with only the destination IP address.

Subsequently, the path specification unit 16 stores the specification result in the attack path storage unit 111 (S504). For example, the attack information and the path information associated in Step S503 are stored in the attack path storage unit 111 in a state in which the association is maintained. The attack information and the attack path information stored in the attack path storage unit 111 may be deleted from the attack information storage unit 112 or the path information storage unit 113.

In terms of recording the IP address of each router R, the IP address of each router R may be recorded in the option field by using the record route (RR) mechanism defined by IPv4 (RFC791).

As described above, according to the present embodiment, the forwarding point is selected from among the routers R in consideration of the traffic volume of each router R and the traffic volume capable of being handled by the protection apparatus 60 (the resource capacity of the protection apparatus 60). As a result, for example, the transfer cost can be reduced by increasing the usage rate of the handling resources of the protection apparatus 60 and preventing the traffic returned without being handled in the protection apparatus 60 being forwarded as much as possible. Further, the attack traffic volume can be reduced to the extent that the service can be continued. Accordingly, it is possible to select a forwarding point that can increase the likelihood that attack traffic is appropriately handled.

The forwarding point is changed based on a feedback result of handling status, and thus, handling can be more effectively executed.

An example has been described in the present embodiment in which the path of attack communication related to a DDos attack is specified, but the present embodiment may be applied to a case where a path related to another specific type of communication is specified.

Although a router has been described an example of the transfer apparatus, the present embodiment may be applied to a transfer apparatus other than a router, such as a switch.

In the present embodiment, the control apparatus 10 is an example of an attack handling location selection apparatus. The attack path status confirmation unit 11 is an example of an acquisition unit. The handling location selection unit 12 is an example of a selection unit.

Embodiments of the present invention have been described above in detail. However, the present invention is not limited to the specific embodiments and can be subjected to various modifications and changes within the scope of the gist of the present invention disclosed in the claims.

REFERENCE SIGNS LIST

10 Control apparatus
11 Attack path status confirmation unit
12 Handling location selection unit
13 Attack information receiving unit
14 Control unit
15 Path information receiving unit
16 Path specification unit
21 Controlled unit
22 Packet receiving unit
23 Address recording unit
24 Path information transmission unit
25 Packet transferring unit
26 Control information storage unit
30 Security apparatus
40 Flow collector
50 Path control apparatus
60 Protection apparatus
100 Drive apparatus
101 Recording medium
102 Auxiliary storage apparatus
103 Memory apparatus
104 CPU
105 Interface apparatus
112 Attack information storage unit
113 Path information storage unit
B Bus
R1, R2, R3, R4, R5, R6, R7, R8 Router
X Attack source
Y Apparatus

The invention claimed is:

1. An attack handling location selection apparatus, comprising:
a computer processor;
a memory storing instructions, wherein the instructions are executed by the computer processor to:
acquire, in a plurality of first transfer apparatuses, traffic volumes related to a path of an attack traffic; and
assign, in an ascending order of the traffic volumes, priorities to a plurality of second transfer apparatuses extracted from the plurality of first transfer apparatuses based on a first comparison between a traffic volume in each of the plurality of first transfer apparatuses and an upper limit value of a traffic volume capable of being handled by a protection apparatus configured to handle the attack traffic, and select, as a first forwarding point of the attack traffic to the protection apparatus, a highest-ranking third transfer apparatus in the priorities,
wherein the first comparison comprises a determination that each of the plurality of the second transfer apparatuses has a traffic volume equal to or greater than the upper limit value of the traffic volume capable of being handled by the protection apparatus,
wherein, in response to the selecting of the highest-ranking third apparatus as a first forwarding point and in response to the highest-ranking third apparatus having forwarded the attack traffic to the protection apparatus, perform a second comparison between a ratio of an actual handling amount for the attack traffic by the protection apparatus to traffic volume between the third transfer apparatus and the protection apparatus, and a ratio of an estimated value of the handling amount to an estimated value of traffic volume between a fourth transfer apparatus and the protection apparatus, and, when the second comparison indicates that the ratio of the actual handling amount for the attack traffic by the protection apparatus to the traffic volume between the third transfer apparatus and the protection apparatus is less than the ratio of the estimated value of the handling amount to the estimated value of traffic volume between the fourth transfer apparatus and the protection apparatus, change from the first forwarding point and select, as a new forwarding point, the fourth transfer apparatus having a next priority after the highest-ranking third transfer apparatus in the priorities in order to minimize transfer cost.

2. The attack handling location selection apparatus according to claim 1, wherein the computer processor is further configured to assign, in descending order of the traffic volumes, the priorities to the plurality of second transfer apparatuses among the plurality of first transfer apparatuses, each of the second transfer apparatuses having a traffic volume less than the upper limit value of the traffic volume capable of being handled by the protection apparatus.

3. The attack handling location selection apparatus according to claim 2, wherein, in a state in which the attack traffic is forwarded to the protection apparatus from the highest-ranking third transfer apparatus, the computer processor selects, as the new forwarding point, the fourth transfer apparatus having a next priority after the third transfer apparatus in the priorities based on a comparison between a traffic volume of the fourth transfer apparatus and an actual handling amount for the attack traffic by the protection apparatus.

4. The attack handling location selection apparatus according to claim 1, wherein the computer processor selects, as the new forwarding point, the third transfer apparatus based on a comparison between the actual handling amount by the protection apparatus in a state in which the traffic is forwarded to the protection apparatus from the fourth transfer apparatus and the actual handling amount by the protection apparatus in a state in which the traffic is forwarded to the protection apparatus from the third transfer apparatus.

5. An attack handling location selection method executed by a computer, comprising:
acquiring, in a plurality of first transfer apparatuses, traffic volumes related to a path of an attack traffic; and
assigning priorities, in an ascending order of the traffic volumes, to a plurality of second transfer apparatuses extracted from the plurality of first transfer apparatuses based on a first comparison between a traffic volume of each of the plurality of first transfer apparatuses and an upper limit value of a traffic volume capable of being handled by a protection apparatus configured to handle the attack traffic, and selecting, as a forwarding point of the attack traffic to the protection apparatus, a highest-ranking third transfer apparatus in the priorities,
wherein the first comparison comprises a determination that each of the plurality of second transfer apparatuses has a traffic volume equal to or greater than the upper limit value of the traffic volume capable of being handled by the protection apparatus, and
wherein, in response to the selecting of the highest-ranking third apparatus as a first forwarding point and in response to the highest-ranking third apparatus having forwarded the attack traffic to the protection apparatus, performing a second comparison between a ratio of an actual handling amount for the attack traffic by the protection apparatus to a traffic volume between the third transfer apparatus and the protection apparatus, and a ratio of an estimated value of the handling amount to an estimated value of a traffic volume between a fourth transfer apparatus and the protection apparatus, and, when the second comparison indicates that the ratio of the actual handling amount for the attack traffic by the protection apparatus to the traffic volume between the third transfer apparatus and the protection apparatus is less than the ratio of the estimated value of the handling amount to the estimated value of traffic volume between the fourth transfer apparatus and the protection apparatus, changing from the first forwarding point and selecting, as a new forwarding point, the fourth transfer apparatus having a next priority after the highest-ranking third transfer apparatus in the priorities in order to minimize transfer cost.

\* \* \* \* \*